United States Patent

[11] 3,615,238

[72] Inventors Donald J. Bentley
c/o Bentley Laboratories 3107 S. Kilson St., Santa Ana, Calif. 92707;
Richard A. De Wall, 247 Northview Road, Dayton, Ohio 45419
[21] Appl. No. 857,044
[22] Filed Sept. 11, 1969
[23] Division of Ser. No. 601,000, Dec. 17, 1966, Pat. No. 3,488,158
[45] Patented Oct. 26, 1971

[54] OXYGENATOR
17 Claims, 6 Drawing Figs.
[52] U.S. Cl. .................................................. 23/258.5,
128/400, 165/169
[51] Int. Cl. ..................................................... A61m 1/03
[50] Field of Search .......................................... 23/258.5;
128/400, DIG. 3; 261/124, 153, DIG. 28; 165/169

[56] References Cited
UNITED STATES PATENTS
| | | | |
|---|---|---|---|
| 2,981,253 | 4/1961 | De Wall et al. ................ | 23/258.5 |
| 3,103,928 | 9/1963 | Broman ......................... | 23/258.5 |
| 3,256,883 | 6/1966 | De Wall ......................... | 23/258.5 |
| 3,468,631 | 9/1969 | Raible et al. .................... | 23/258.5 |

Primary Examiner—Joseph Scovronek
Assistant Examiner—Barry S. Richman
Attorney—Hofgren, Wegner, Allen, Stellman & McCord

ABSTRACT: An improvement in a unitary blood oxygenator of the type having an oxygenating chamber, a settling chamber and a heat exchange chamber in communication with each other characterized by ribs formed in the oxygenating chamber for positioning the debubbling sleeve spaced from the walls of the chamber; further characterized by the provision of a settling chamber of reduced volume, preferably being thin in horizontal cross section and further characterized by refinements in the heat exchange jacket about the heat exchange chamber in the form of angularly oriented, indented ribs in the shell of the heat exchange chamber.

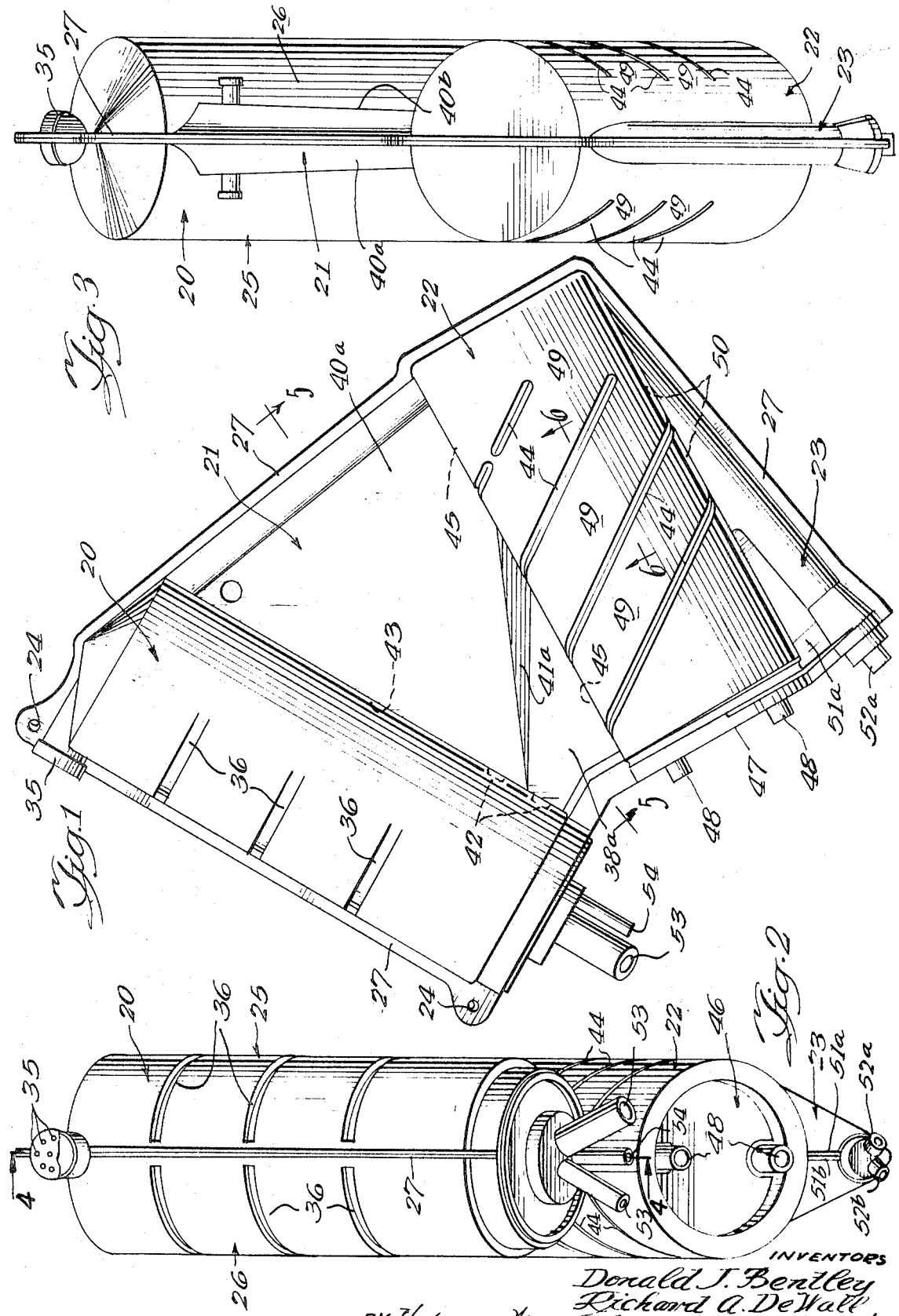

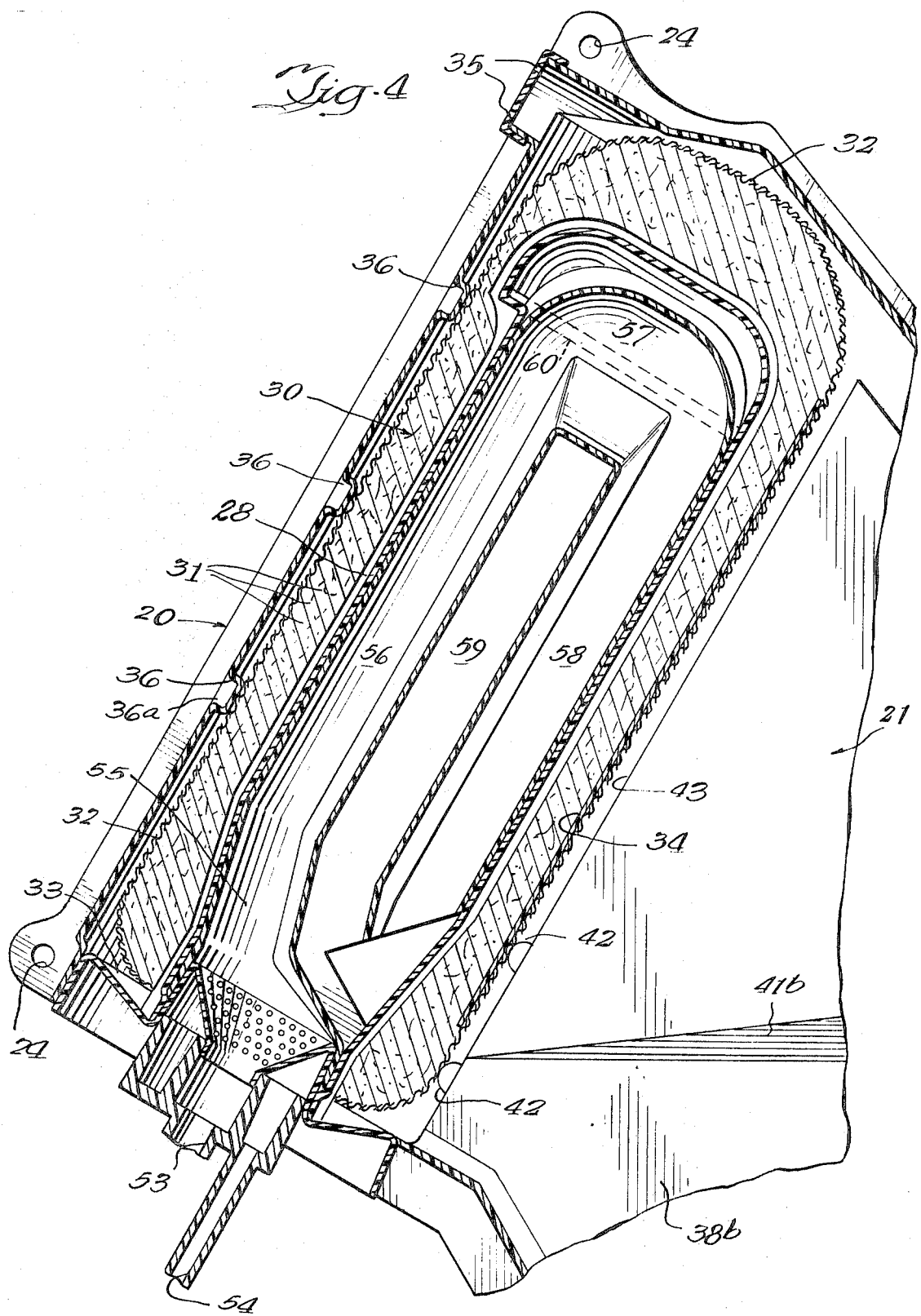

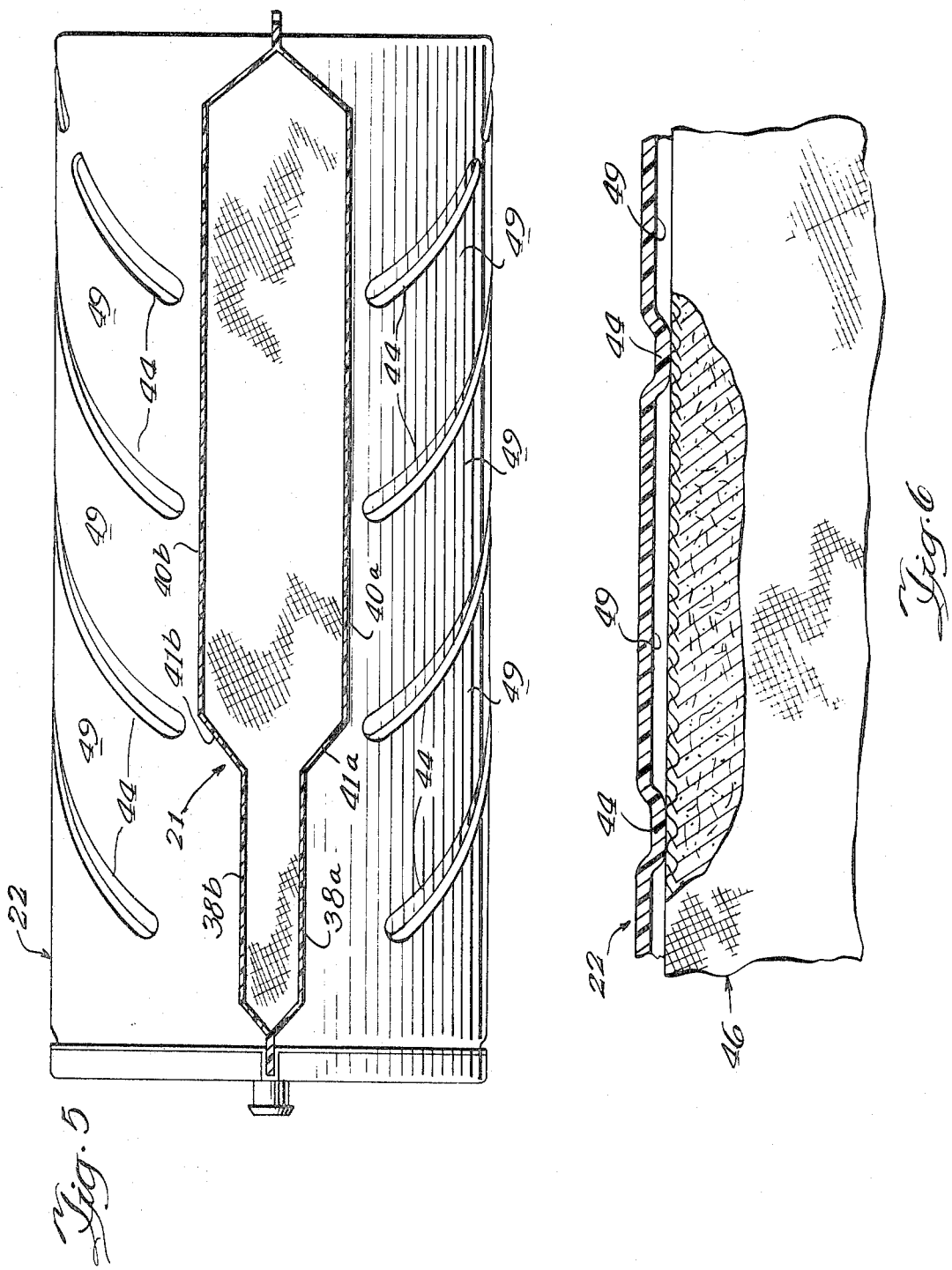

3,615,238

OXYGENATOR

REFERENCE TO RELATED APPLICATION

This application is a division of our copending application Ser. No. 601,000 filed Dec. 17, 1966, entitled "Bubbler Assembly for Oxygenator" now U.S. Pat. No. 3,488,158, issued Jan. 6, 1970.

BACKGROUND OF THE INVENTION

1. Field of The Invention

This invention relates to blood-treating apparatuses and, more particularly, to an improvement in a unitary blood oxygenator.

2. Brief Description of the Prior Art

The present invention is an improvement in the blood oxygenators shown in the patent issued to Donald A. Raible et al., U.S. Pat. No. 3,468,631, issued Sept. 23, 1969, entitled "Oxygenator with Heat Exchanger" and further an improvement in the structure shown in the patent to Richard A. DeWall, U.S. Pat. No. 3,256,883, issued June 21, 1966 and entitled "Oxygenator with Heat Exchanger." Each of the structures disclosed therein is a complete blood oxygenator assembly including an oxygenator chamber and a heat exchange chamber.

As stated with respect to the improvements set forth in each of the aforementioned application and issued patent, there is a continuing need and desire in the blood oxygenator art for thorough intermixing of blood and oxygen and thorough debubbling of oxygenated blood and thorough filtering of particles from the blood, including the elimination of accumulated blood fragments. Most importantly, it is essential that such fragments or bubbles are eliminated from the blood before the blood is returned to the patient, however, of course, it is necessary that the blood be provided with a proper amount of oxygen and heated to a sufficient temperature prior to return to the patient. Thus, the structure provided for treating the blood must be such as to provide for the release of such bubbles, the filtering of such fragments and the prevention of any further bubbles and fragments in the blood. The present invention is directed to meeting the aforementioned continuing need and desire to provide blood treatment apparatuses which minimize or eliminate the undesirable effects set forth herein above.

SUMMARY OF THE INVENTION

The present invention is directed, in brief, to the provision of an improved unitary blood oxygenator of the type having an oxygenating chamber, a settling chamber and a heat exchange chamber in communication with each other.

The best mode currently contemplated by us for carrying out the invention includes the provision of a one-piece plastic molded structure having a generally circular-cylindrical oxygenating chamber, a substantially thin elongate settling chamber in communication with the oxygenating chamber, and a generally circular-cylindrical heat exchange chamber therebelow. The interior of the oxygenating chamber is provided with inwardly directed ribs and detents for holding the defoaming element about the bubbler assembly, spaced from the walls of the oxygenating chamber. The central settling chamber is defined by two generally parallel, closely spaced-apart sidewalls to provide a chamber of reduced volume with the lower end of the chamber having tapering sidewalls so that in operative position, a small volume of blood will bring the minimum level of blood in the central chamber in the bottom of the oxygenator chamber to eliminate churning and dripping which might create undesirable bubbles in the blood. In addition, the rib structure about the heat exchange chamber is altered to provide acutely angled blood passageways so as to prevent the free flow of blood with bubbles downwardly and about the heat exchange chamber and to eliminate the possibility of bubble-containing blood running directly into the collecting chamber near the outlet of the oxygenator for return to the patient.

BRIEF DESCRIPTION OF THE DRAWINGS

The invention is illustrated in a preferred embodiment in the accompanying drawings in which:

FIG. 1 is a side elevational view of the oxygenator device of the instant invention, the view showing the oxygenator device tilted at a slightly greater angle toward the vertical than is the case when it is in ordinary use;

FIG. 2 is an end elevational view taken from the left of FIG. 1;

FIG. 3 is an end elevational view taken from the right of FIG. 1;

FIG. 4 is an enlarged fragmentary sectional view of the oxygenating chamber and the enclosed bubbler assembly taken as indicated along line 4—4 of FIG. 2;

FIG. 5 is a partial sectional view of the heat exchanger assembly taken generally along line 5—5 of FIG. 1; and FIG. 6 is a sectional view taken as indicated on line 6—6 of FIG. 1 to show the general structural arrangement of the ribs in the heat exchange chamber.

While this invention is susceptible of embodiment in many different forms, there is shown in the drawings and will herein be described in detail a specific embodiment therefor, with the understanding that the present disclosure is to be considered as an exemplification of the principles of the invention and is not intended to limit the invention to the embodiment illustrated.

BRIEF DESCRIPTION OF THE PREFERRED EMBODIMENT

FIGS. 1, 2, and 3 each show the preferred embodiment of the bubble-type oxygenator device of this invention. The oxygenator device shown includes an upper cylindrical chamber 20 (commonly called an oxygenating chamber), a narrow central chamber 21 and a lower cylindrical chamber 22 (commonly called a heat exchanging chamber), and a collecting chamber 23. In use, the oxygenator device may be suspended by hooks or other appropriate means passing through apertures 24 formed at opposite ends of the upper chamber 20. When in normal operation, the angle formed by the axis of the upper cylindrical chamber 20 with the horizontal is preferably in the range of approximately 35 to 50°. The structure shown in FIG. 1 is at a slightly greater angle and is not intended to illustrate the preferred angular relationship.

The chambers 20, 21, 22, and 23 are preferably formed from a polycarbonate plastic (sold by General Electric under the trademark "Lexan") which may either be vacuum formed or injection molded to shape two self-sustaining substantially rigid shells 25, 26, which are substantially identical with each other except one is the mirror image of the other. The two shells are each provided with a coplanar peripheral flange 27, and the peripheral flanges of the two shells are adhered together by a suitable adhesive to form a unitary, transparent structure. The plastic is inert, nontoxic, impervious to the passage of gases and liquids, and sterilizable. It contains no leechable plasticizers which may be traumatic to the blood, and it is exceptionally strong and durable to withstand accidental blows or shocks. In addition, it has a natural electrical surface charge which is similar in nature to the natural charge of the hemoglobin of the blood so that there is no tendency toward adherence between the blood and the surface of the plastic.

The structure associated with the upper or oxygenating chamber 20 is best shown in FIG. 4. This structure includes the bubbler assembly designated 28 of the instant invention, which bubbler assembly is preferably mounted so that its longitudinal axis substantially coincides with the longitudinal axis of the cylindrical chamber 20. The bubbler assembly shown herein is described in greater detail and claimed in our copending application Ser. No. 601,000, filed Dec. 12, 1966, entitled "Bubbler Assembly for Oxygenator" now U.S. Pat. No. 3,488,158, issued Jan. 6, 1970. The function generally of the bubbler assembly is to intermix oxygen gas with incoming venous blood so as to form films of blood in bubble form, which blood bubbles are advanced in an oxygen atmosphere through the bubbler assembly to an outlet or outlets. In other words, in the bubbler assembly, oxygen is taken on by the venous blood and carbon dioxide carried by such blood is released. The degree to which the blood is saturated with oxygen at ambient temperatures and pressures depends primarily upon the extent to which all of the blood is bubbled, the character of the films in the bubbles produced (that is their thickness or thinness and size), and the time of exposure of the blood films to the oxygen atmosphere.

As the blood bubbles pass out of the outlet of the bubbler assembly, the bubbles come into contact with a defoaming means 30. The defoaming means 30 is preferably formed in the shape of a sleeve which is closed at one end and fits over the outer lateral surface of the bubbler assembly 28. The sleeve is constructed of a plurality of similarly shaped sleeve layers of knitted mesh material which layers are nested one within another to provide a multitude of tortuous paths of flow. The knitted layers 31 are preferably formed of polypropylene fibers each of which is generally smooth and round and presents no rough surfaces to the flow of blood passing therethrough. Thus the layers have no rough edges which may cause damage to the hemoglobin. The polypropylene layers are impregnated or coated with a non-toxic antifoam composition of the medical silicone antifoam type which is well known in the art, and which will not wash off in the blood during the debubbling operation. As the blood bubbles contact the defoaming layers, rivulets of oxygenated blood are formed, and the free oxygen and carbon dioxide are given off and pass outwardly of the upper chamber.

As will be seen, oxygenated blood must pass through a considerable portion of the defoaming means and through a filter means in order to reach reservoir 21 and collecting chamber 23. As herein shown, the mesh layers 31 are retained in place about the bubbler assembly 28 by a porous cover or bag 32 preferably formed of nylon material and having a pore size of about 0.125 sq. mm. which filters the blood as it passes out of the bubbler assembly. In the adult size oxygenator, the cover 32 preferably has a surface area of approximately 144 sq. in. The nylon bag 32 is provided with drawstrings 33 at one end which are drawn tightly around the bubbler assembly so that all of the blood flowing out of the bubbler assembly will be caused to pass through the nylon fabric. In the adult size bubbler oxygenator, it is preferred to provide seven layers 31 of the polypropylene fabric, while in the pediatric and infant size the number of layers may be decreased. Between the two outermost layers of the polypropylene mesh material, a polyethylene sheet 34 is positioned so as to extend about the bubbler assembly for nearly 360°. The arcuately disposed lower marginal edge of the polyethylene sheet 34 is normally positioned about 1½ to 2 inches upwardly of the lower end of the oxygenator chamber 20, and the upper arcuate marginal edge of the sheet 34 is located approximately the same distance from the upper end of the oxygenator chamber 20. The purpose of the polyethylene sheet 34 is to form a troughlike formation for the debubbled blood so that this blood is caused to flow angularly downwardly through the mesh layers 31 within the sheet 34 to maximize the debubbling operation. Also, as will later be explained, the sheet 34 causes the blood to gradually flow to the lower end of the oxygenator chamber so as to make a smoother entrance into blood in the central chamber 21. If the sheet 34 were not present, some of the debubbled blood may drip down and splash on blood collected in the central chamber 21 so as to cause undesirable bubbling.

The excess free oxygen from the bubbling operation and the oxygen and carbon dioxide emitted in the debubbling or defoaming operation escape from the oxygenating chamber 20 through vents 35. If desired, the cap containing vents 35 may be spaced from the exhaust port to provided annular vents also. As best seen in FIGS. 1, 2, and 4, a number of pairs of arcuate indented ribs 36 are positioned to bear against the nylon bag 32 and the layers 31 so as to space intermediate portions of these members from the inner lateral surface of the oxygenator chamber 20, thereby preventing the outer surface of the nylon bag from bearing against the inner lateral surface of the oxygenator chamber 20 in partially sealing relation. Thus gases are free to escape outwardly through the nylon bag, then upwardly to the top of the oxygenator chamber 20, and finally longitudinally outwardly of the chamber 20 between the inner spaced ends 36a of each of the pairs of ribs 36 (FIG. 2) to the vents 35. The gases may also escape to the vents 35 from between the upper end of the nylon bag 32 and the inner face of the upper end of the oxygenator chamber 20, as shown in FIG. 4.

As best seen in FIG. 4, short indentations 42 are preferably formed at the lower end of the chamber 20 to afford end supports for the nylon bag 32 and thereby space the bag from the elongated, narrow, open upper end 43 of the central chamber 21. Thus, the nylon bag 32 when wetted with blood will be prevented from lodging in sealing engagement with the open end or slot 43.

The narrow central or intermediate chamber 21 provides a kind of reservoir for the oxygenated blood. The central chamber has sidewall portions 38a, 38b, which are generally parallel and rather closely spaced. The sidewall portions 38a, 38b are joined to the large sidewall portions 40a, 40b by diverging sidewall portions 41a, 41b. The sidewall portions 40a and 40b are also generally parallel but, because of the diverging sidewall portions 41a and 41b, are spaced farther apart than are the sidewall portions 38a and 38b. Thus the lower end of the central chamber or reservoir 21 accommodates a small volume of oxygenated blood and will fill rather rapidly in use so that during use the level of the blood will preferably extend into the lower end of the upper oxygenator chamber 20 (see FIGS. 1 and 4) and inundate the lower marginal edge of the sheet 34.

The lower mating portions of shells 25, 26 afford the lower cylindrical chamber 22, and the shell portions are provided with indented pairs of arcuate ribs 44, the corresponding pairs in each shell portion being positioned in a plane extending at an acute angle to the axis of the lower chamber 22, as shown in FIG. 1. The central chamber 21 communicates with the cylindrical chamber 22 through a narrow elongated slot 45 extending substantially the full length of the chamber 22.

The lower chamber 22 houses a water jacket 46 which makes a close fit with and abuts the arcuate ribs 44 so as to arcuately provide a number of wide, shallow passages 49 for blood flow between the outer surface of the water jacket 46 and the inner surfaces of the shells 25, 26, the depth of the passages preferably being on the order of 0.0065 to 0.0080 inches.

The water jacket 46 is hermetically sealed at 47, and fittings 48 are provided for connection to a source of temperature control liquid so as to control the temperature of the wide, thin streams of oxygenated blood passing over the outer surface of the water jacket. In the adult size oxygenator, the heat-exchanging surface of the jacket 46 preferably has an area of approximately 270 sq. in.

In addition to defining wide, shallow passages 49, the ribs 44 function as a bubble trap for any gas which might on occasion come out of solution. Although the passages are inclined, the blood will tend to flow in a perpendicular direction which creates a minimal backwash along the lower margin of each rib 44 and affords an effective bubble trap. At flow rates over 4 liters per minute, the pressure has been measured to be about 1 cm. of water less next to the lower margin of each rib 44 than in the center of a passage 49. This pressure differential tends to draw any bubbles upwardly out of the blood and against the lower margin of the rib; thereafter hydrostatic pressure causes the bubbles to rise upwardly to the surface of the blood in the central chamber 21 and thence upwardly and outwardly to the vents 35.

From the chamber 22 the temperature-controlled oxygenated blood passes out an elongated port 50 extending the length of the bottom of chamber 21 into the collecting chamber 23. At one end the port 50 is narrowed substantially in width to a very small fraction of an inch as a result of the parallel, closely adjacent fingerlike sections 51a, 51b formed in shells 25, 26, respectively. Thus, in operation of the device, the narrow end of port 50, which is positioned lower than the remainder of the port, will accommodate only a relatively small amount of blood flowing therethrough; and therefore the blood does not flow preferentially only around the lowermost part of jacket 46, but also flows about upper parts of the jacket to make maximum use of the inclined heat-exchanging surface of the jacket. A small passage is also preferably provided extending from the extreme bottom corner of the heat exchange chamber to the collecting chamber to assure complete drainage of the heat exchange chamber. From the collecting chamber 23 the oxygenated blood is conducted through the discharge ports in the fittings 52a, 52b to the arterial system of the patient.

In operation, blood enters the oxygenating chamber 20 through blood inlets 53 and oxygen is fed into the oxygenating chamber through inlet 54. The blood and oxygen are intermixed and travel through the tortuous passageway 55 in the interior of the bubbler 28 and, particularly, through upper segment 56, around connecting segment 57 into lower segment 58 and finally into central segment 59 from which the blood is fed outwardly of the bubble through outlet 60. After passing through outlet 60, the blood passes outwardly and downwardly of the exterior of the bubbler 28 in contact with the defoaming means 30 whereupon sheet 34 causes the blood to flow downwardly and outwardly through slot 43 into the central chamber or reservoir, 21.

In central chamber 21, the blood is held in a generally sheetlike column and flows therefrom by means of opening 45 into the heat exchange chamber 22 in a divided annular path around the water jacket 46. The blood travels in the shallow passages 49 which are acutely angled relative to the axis of the heat exchange chamber and the blood bubbles tend to rise upwardly along ribs 44. From the heat exchange chamber, the blood travels to the blood-collecting chamber 23 from which it may be returned to a patient through discharge ports in fittings 52a and 52b.

The foregoing detailed description has been given for clearness of understanding only, and no unnecessary limitations should be understood therefrom, as some modifications may be obvious to those skilled in the art.

We claim:

1. A blood oxygenator and heat exchanger comprising: a casing; an oxygenator chamber in the upper part of the casing with blood and oxygen inlet means and gas outlet means, the oxygenator chamber having a top and bottom edge and forward and rear ends, and means along the bottom edge of the oxygenator chamber defining an elongate trough extending substantially from the front to rear end of the oxygenator chamber for feeding blood downwardly therefrom; and a heat exchange chamber in the lower part of the casing in communication with the oxygenator chamber by means defining an opening at the top thereof, the heat exchange chamber including means for conducting a heat exchange medium toward and away from the heat exchange chamber and a heat exchange element within the casing in the heat exchange chamber, said heat exchange element having an exterior defined by a shell, with rib means in the lower part of the casing defining, together with the heat exchange element shell, a plurality of wide, shallow blood passages about the heat exchange element, said passages extending at an acute angle to the axis of the heat exchange chamber and being in communication with a blood outlet means for return to the arterial system of a patient.

2. The oxygenator of claim 1 wherein the rib means defining the shallow passages are indented in the casing relative to the heat exchange chamber.

3. The oxygenator of claim 2 wherein the rib means generally abut the heat exchange element in the heat exchange chamber.

4. A blood oxygenator comprising: a casing; an oxygenator chamber in the upper part of the casing with blood and oxygen inlet means and gas outlet means, the oxygenator chamber having a top and bottom edge and forward and rear ends, and means along the bottom edge of the oxygenator chamber defining an elongate trough extending substantially from the front to the rear end of the oxygenator chamber for feeding blood downwardly therefrom; and a heat exchange chamber in the lower part of the casing with means for conducting a heat exchange medium toward and away from the heat exchange chamber and means for conducting blood away therefrom; and a settling chamber between the oxygenator chamber and the heat exchange chamber defined by spaced walls in communication with said oxygenator chamber through said elongate trough and in flow communication with said heat exchange chamber, said walls being closely spaced apart relative to the width of said chambers to define a sheetlike column in the space between the heat exchange and oxygenator chambers of reduced thickness relative to the said chambers, one end of the settling chamber adjacent the heat exchange chamber being of further reduced thickness relative to the remainder of the settling chamber.

5. The oxygenator of claim 4 wherein the walls of the settling chamber are generally planar.

6. The oxygenator of claim 4 wherein the walls of the settling chamber extend from the edges of said opening downwardly towards said heat exchange chamber and are spaced apart a distance substantially no greater than the distance between the opposite edges defining the sheetlike opening in the bottom of the oxygenator chamber.

7. The oxygenator of claim 6 wherein the heat exchange chamber has an opening therein, the edges of which define a generally thin, elongate slot with a reduction at one end, with the walls of the settling chamber generally coinciding with the edges of the thin, elongate slot at the top of the heat exchange chamber.

8. In a unitary blood oxygenator of the type having an oxygenating chamber of a generally hollow interior cylindrical configuration with a bubbler assembly and surrounding defoamer sleeve positioned therein, the improvement which comprises: rib means extending inwardly from the interior of the oxygenator chamber a distance sufficient to hold a bubbler assembly and surrounding defoamer sleeve intended for use therein spaced from remaining portions of the oxygenator chamber interior.

9. The oxygenator of claim 8 wherein the rib means are interrupted to provide gas passageways therethrough.

10. The oxygenator of claim 9 wherein the rib means are formed in the upper part of the oxygenator chamber.

11. The oxygenator of claim 10 wherein the rib means are interrupted at the top portion of the oxygenator chamber.

12. The oxygenator of claim 10 wherein the rib means lie in planes generally transverse to the axis of the oxygenator chamber.

13. The oxygenator of claim 12 wherein the rib means are discontinuous at the bottom of the chamber.

14. In a blood oxygenator of the type having an oxygenator chamber with means for conducting blood and oxygen thereto and gas outlet means and trough means at the bottom thereof for feeding blood to other components of the oxygenator and a generally hollow interior cylindrical oxygenator chamber with a debubbler assembly and surrounding defoamer sleeve positioned therein, the improvement which comprises: bubbler assembly supporting detent means in the oxygenator chamber near the trough means for supporting portions of the bubbler assembly and surrounding defoamer sleeve spaced away from said trough means.

15. The oxygenator of claim 14 wherein the detent means are formed on the forward end of the oxygenator chamber.

16. The oxygenator assembly of claim 15 wherein the detent means are formed on opposite sides of the through means.

17. The oxygenator of claim 16 wherein the detent means are formed in the lower end of the oxygenator chamber.